United States Patent
Shen et al.

(10) Patent No.: US 10,512,897 B2
(45) Date of Patent: Dec. 24, 2019

(54) MICRON-SCALE CERIUM OXIDE PARTICLE HAVING MULTI-CORE SINGLE-SHELL STRUCTURE AND PREPARATION METHOD THEREFOR

(71) Applicant: TIANJIN UNIVERSITY, Tianjin (CN)

(72) Inventors: Meiqing Shen, Tianjin (CN); Jun Wang, Tianjin (CN); Jianqiang Wang, Tianjin (CN); Guangxi Wei, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 163 days.

(21) Appl. No.: 15/550,336

(22) PCT Filed: Feb. 15, 2015

(86) PCT No.: PCT/CN2015/073103
§ 371 (c)(1),
(2) Date: Aug. 10, 2017

(87) PCT Pub. No.: WO2016/127430
PCT Pub. Date: Aug. 18, 2016

(65) Prior Publication Data
US 2018/0029012 A1    Feb. 1, 2018

(51) Int. Cl.
*B01J 23/10* (2006.01)
*B01J 35/00* (2006.01)
(Continued)

(52) U.S. Cl.
CPC .......... *B01J 23/10* (2013.01); *B01J 35/0013* (2013.01); *B01J 35/08* (2013.01); *B01J 35/1014* (2013.01);
(Continued)

(58) Field of Classification Search
CPC ............ B01J 2523/00; B01J 2523/3712; B01J 2523/72; B01J 2523/824; B01J 23/10; B01J 23/34; B01J 23/63; B01J 27/04; B01J 27/045; B01J 35/0006; B01J 35/0013; B01J 35/002; B01J 35/008; B01J 35/023; B01J 35/08; B01J 35/1014; B01J 35/1019; B01J 35/1038; B01J 35/1042; B01J 35/1061;
(Continued)

(56) References Cited

U.S. PATENT DOCUMENTS

2008/0051283 A1*   2/2008   Miura .................... B01J 23/10
                                                              502/304

* cited by examiner

Primary Examiner — Amber R Orlando
Assistant Examiner — Syed T Iqbal
(74) Attorney, Agent, or Firm — Gokalp Bayramoglu

(57) ABSTRACT

The present invention involves micron-scale cerium oxide particles having a multi-cores single-shell structure, comprising: a cerium oxide shell, the shell being composed of crystalline and/or amorphous nano-scale cerium oxide particles; and a plurality of nano-scale cerium oxide grain cores aggregates located in the interior of the shell. Also involved is a preparation method for the micron-scale cerium oxide particle having a multi-cores single-shell structure. A supported catalyst with the micron-scale cerium oxide particles according to the invention as the support have good hydrothermal stability and good sulfur resistance, and the active components of the supported catalyst are not easily embedded, and the supported catalyst has a great application prospect in the field of catalytic oxidation of exhaust emissions such as CO, NO or volatile organic compounds.

9 Claims, 12 Drawing Sheets

(51) Int. Cl.
  *B01J 35/08* (2006.01)
  *B01J 35/10* (2006.01)
  *B01J 37/02* (2006.01)
  *B01J 37/03* (2006.01)
  *B01J 37/08* (2006.01)
  *C01F 17/00* (2006.01)

(52) U.S. Cl.
  CPC ....... *B01J 35/1019* (2013.01); *B01J 37/0221* (2013.01); *B01J 37/0236* (2013.01); *B01J 37/031* (2013.01); *B01J 37/08* (2013.01); *C01F 17/0043* (2013.01); *C01P 2002/60* (2013.01); *C01P 2004/32* (2013.01); *C01P 2004/50* (2013.01); *C01P 2004/61* (2013.01); *C01P 2004/64* (2013.01); *C01P 2004/84* (2013.01); *C01P 2006/12* (2013.01)

(58) Field of Classification Search
  CPC ............... B01J 37/0018; B01J 37/0045; B01J 37/0072; B01J 37/0221; B01J 37/0236; B01J 37/031; B01J 37/033; B01J 37/035; B01J 37/08; B01J 37/20; B01D 53/945; C01F 17/0043; C01P 2002/60; C01P 2002/72; C01P 2004/03; C01P 2004/32; C01P 2004/50; C01P 2004/61; C01P 2004/62; C01P 2004/64; C01P 2004/84; C01P 2006/12

See application file for complete search history.

MICRON-SCALE CERIUM OXIDE PARTICLE HAVING MULTI-CORE SINGLE-SHELL STRUCTURE AND PREPARATION METHOD THEREFOR

CROSS-REFERENCE TO RELATED APPLICATIONS

This application is a 371 of PCT/CN2015/073103 filed Feb. 15, 2015 which is incorporated herein by reference in its entirety.

FIELD OF THE INVENTION

The present inventing relates to the technical field of advanced inorganic nano- and/or micro-scale materials, particularly to the technical field of catalyst support.

BACKGROUND OF THE INVENTION

Cerium oxide is an important oxide of rare earth elements, and it has many excellent properties as a catalyst support or an additive to supports, which have been confirmed in catalysis researches. In subsequent researches, it is reported that the cerium oxide can exhibit unique advantages as a catalyst support in oxidative reaction, methanol cleavage and reductive reaction of nitrogen oxides due to good performances in oxygen storage and release and strong redox behaviors between trivalent cerium ions and tetravalent cerium ions.

The physical and chemical properties of cerium oxide greatly depend on the microstructure thereof, e.g., size, morphology, and specific surface area, etc. Cerium oxide materials having micro- and nano-scale porous structure not only can well satisfy requirements of highly effective absorbing materials on the microstructure thereof, but also can increase catalytic active sites of surface by increasing specific surface area, thereby to increase catalytic properties of the cerium oxide materials. Hence, researches for the preparation of such kind of materials have great realistic significance. However, it is found that nano- and/or micro-scale cerium oxide particles and cerium oxide aerogel having a large specific surface area as prepared according to existing methods known in the art, as catalyst supports, have poor mechanical strength and resistance to high temperature, and are easy to be sintered and collapse in hollow structure at a high temperature in use.

When being applied in the field of catalytic after-treatment to exhaust emissions containing CO, NO or volatile organic compounds, supported catalysts as prepared by using cerium oxide having conventional structures as the catalyst support would involve the following defects: 1) Hydrothermal stability is poor. The support per se will easily take sintering and collapsing in hollow structure at a high temperature, which will decreases the surface area and porosity. 2) Active components, e.g., noble metals or transition metals, as supported by the support will be easily embedded during the hydrothermal aging at a high temperature. 3) Sulfur resistance is poor, and if the catalyst is exposed to a sulfur-containing atmosphere for a long period, the catalyst will be deactivated.

The above defects seriously restrict the applications of cerium oxide materials in the field of catalytic after-treatment of exhaust emissions that includes a stationary source and a mobile source. Hence, at now, it is in interest that how to maintain a high specific surface area of a nano-scale cerium oxide support while assuring its mechanical strength and resistance to high temperature.

BRIEF DESCRIPTION OF THE DRAWINGS

FIG. 3B is an enlarged view for showing damaged micro-scale cerium oxide particles having multi-cores single-shell structure at the position circled by the dot line in FIG. 3A, and FIG. 3B can demonstrate the presence of the shell.

FIG. 9-1 is a conversion curve of the CO in the mixed gas, and FIG. 9B is a conversion curve of the $C_3H_6$ in the mixed gas, wherein the symbol A represents the supported catalyst Pd/C3-1 after being subjected to the hydrothermal treatments, and the symbol B represents the supported catalyst Pd/C-0 after being subject to the hydrothermal treatments.

FIG. 10A is a conversion curve of the CO in the mixed gas, and FIG. 10B is a conversion curve of the $C_3H_6$ in the mixed gas, wherein the symbol A represents the supported catalyst Pd/C3-1 after being subject to the sulfurization treatments, and the symbol B represents the supported catalyst Pd/C-0 after being subjected to the sulfurization treatments.

DETAILED DESCRIPTION OF THE INVENTION

Figure 1:
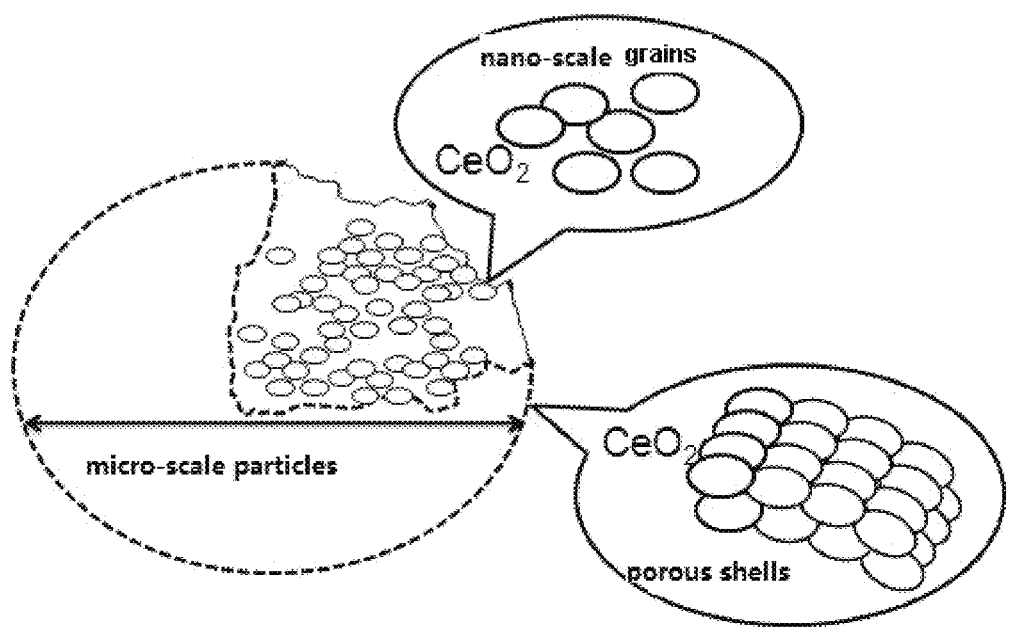
FIG. 1 is a structural schematic diagram of the micro-scale cerium oxide particles having multi-cores single-shell structure according to the invention.
Figure 2A:
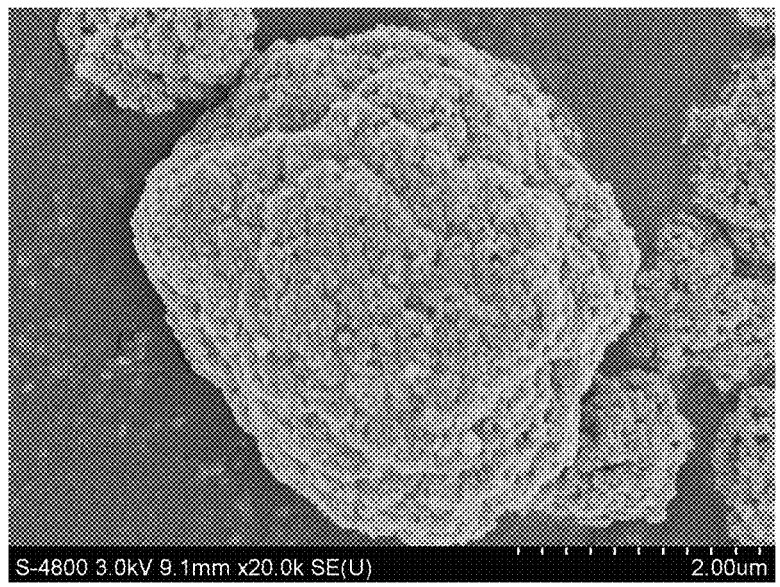
FIG. 2A-FIG. 2B each are a Scanning Electron Microscope (SEM) photograph for showing the nano-scale cerium oxide aggregate particles C-0 without multi-cores single-shell structure as prepared in the comparative example. As seen from the figures, the particles have rough surfaces and obviously exhibit a porous structure. Furthermore, the surfaces of the micro-scale cerium oxide aggregate particles are formed by compactly aggregating nano-scale cerium oxide particles having lower particle size.
Figure 2B:
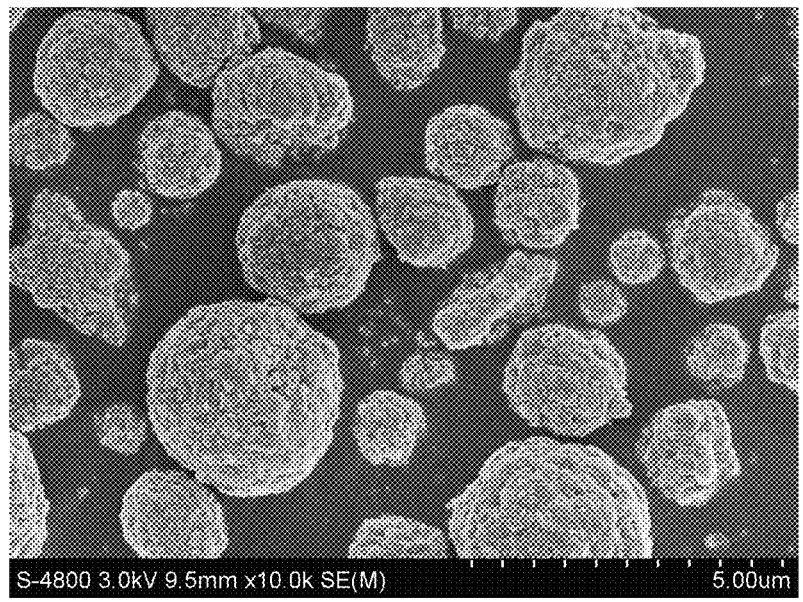
Figure 3A:
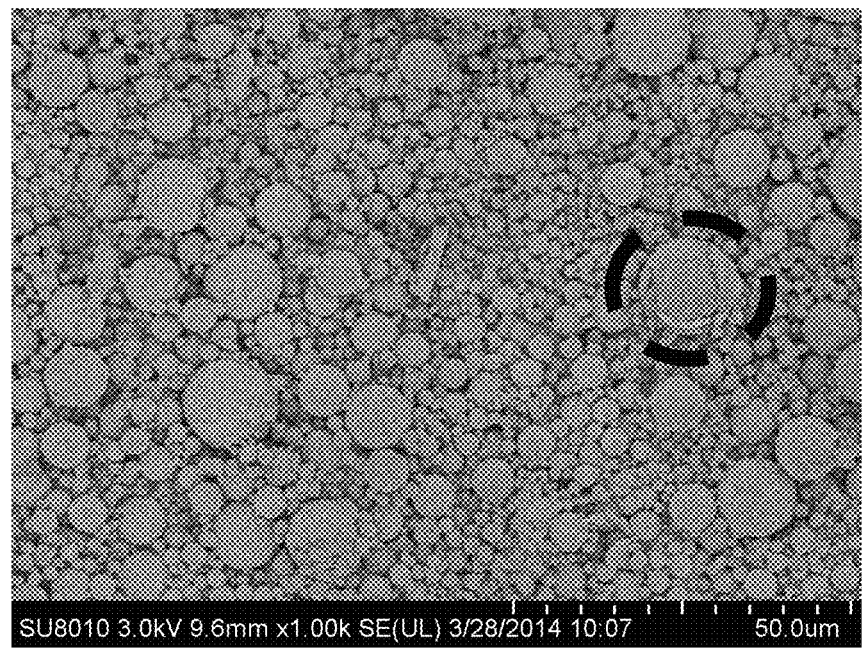
FIG. 3A-FIG. 3B each are a Scanning Electron Microscope (SEM) photograph for showing the micro-scale cerium oxide particles C1-1 having multi-cores single-shell structure as prepared in Example 1 according to the invention. As seen from the figures, the micro-scale cerium oxide particles according to the invention have spherical or sphere-like structure.
Figure 3B:
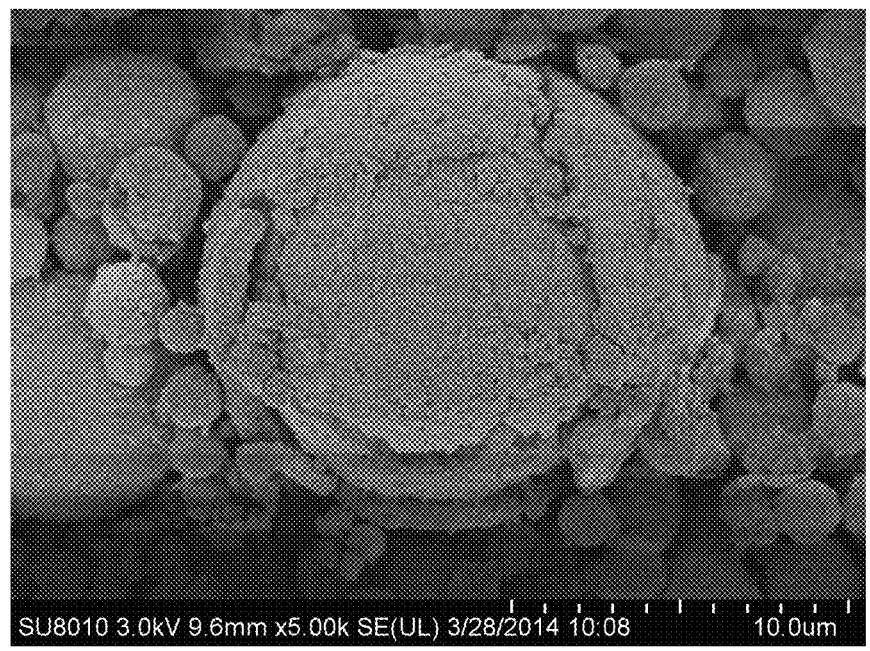
Figure 4:
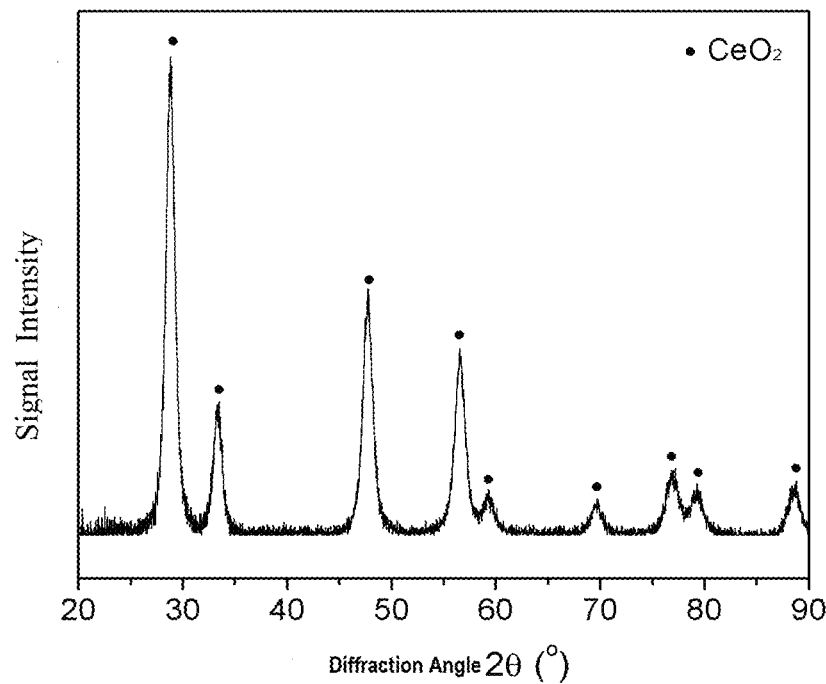
FIG. 4 is an X-ray diffraction (XRD) pattern for showing the micro-scale cerium oxide particles C1-1 having multi-cores single-shell structure as prepared in Example 1 according to the invention. As seen from the figure, the material is in the Cubic Fluorite structure, and all the diffraction peaks are attributed to the Cubic Fluorite structure of the $CeO_2$; according to the broadening width of diffraction peak of the crystal plane (111), it can be calculated that the grain size of the $CeO_2$ is about 8.6 nm; it is proved that the cores of micro-scale cerium oxide particles having multi-cores single-shell structure as prepared according to the method in the invention are crystalline.
Figure 5:
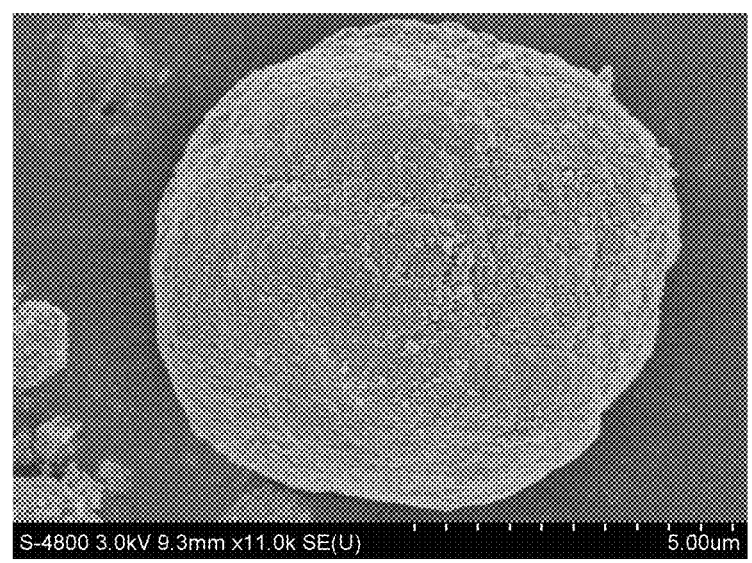
FIG. 5 is a Scanning Electron Microscope (SEM) photograph for showing the micro-scale cerium oxide particles C2-1 having multi-cores single-shell structure as prepared in Example 5 according to the invention. As seen from FIG. 5, the micro-scale cerium oxide particles having multi-cores single-shell structure as prepared according to the method in the invention have relatively smooth surfaces.
Figure 6:
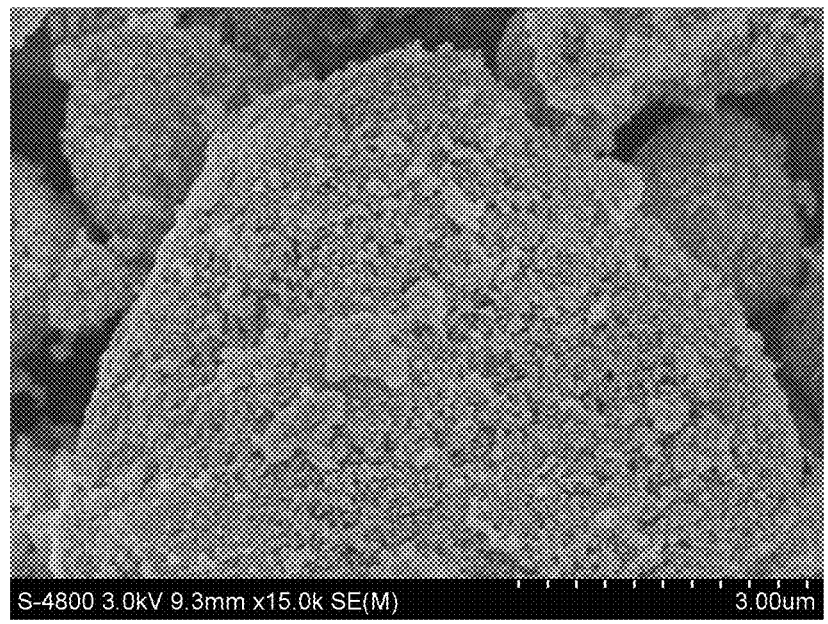
FIG. 6 is a Scanning Electron Microscope (SEM) photograph for showing the micro-scale cerium oxide particles C2-1 having multi-cores single-shell structure as prepared in Example 5 according to the invention after grinding. As seen from FIG. 6, after the grinding, the shells of the micro-scale cerium oxide particles having multi-cores single-shell structure are damaged, and thus the nano-scale cerium oxide grain cores aggregates in the interior of the shells are observed to be in a porous structure.
Figure 7:
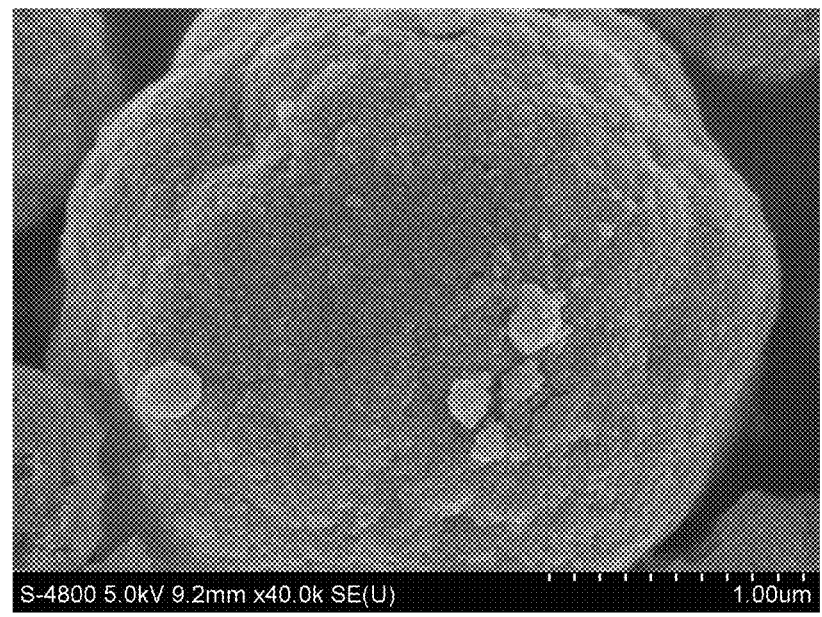
FIG. 7 is a Scanning Electron Microscope (SEM) photograph for showing the micro-scale cerium oxide particles C3-1 having multi-cores single-shell structure as prepared in Example 9 according to the invention. As seen from FIG. 7, the micro-scale cerium oxide particles having a multi-cores single-shell structure as prepared according to the method in the invention have relatively smooth surfaces.
Figure 8:
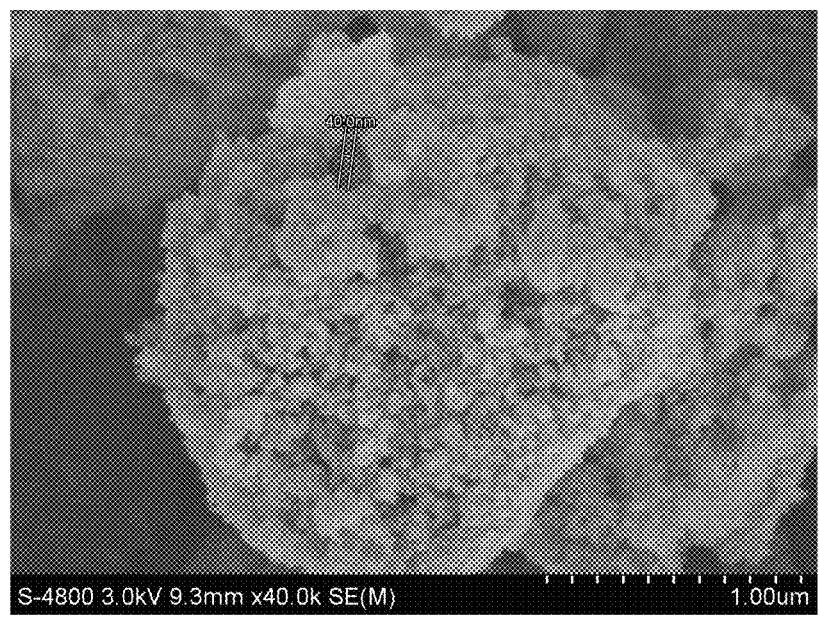
FIG. 8 is a Scanning Electron Microscope (SEM) photograph for showing the micro-scale cerium oxide particles C3-1 having multi-cores single-shell structure as prepared in Example 9 according to the invention after grinding. As seen from FIG. 8, after the grinding, the shells of the micro-scale cerium oxide particles having multi-cores single-shell structure are damaged, and thus the nano-scale cerium oxide grain cores aggregates in the interior of the shells are observed to be in a porous structure.

A first aspect of the invention is directed to a micro-scale cerium oxide particle having multi-cores single-shell structure, comprising: a cerium oxide shell, the shell being composed of crystalline and/or amorphous nano-scale cerium oxide particles; and a plurality of nano-scale cerium oxide grain cores aggregates located in the interior of the shell.

Preferably, the shell is made of crystalline nano-scale cerium oxide particles. There are thousands, ten thousands and even millions of nano-scale cerium oxide grain cores. As for the micro-scale cerium oxide particles having multi-cores single-shell structure according to the invention, the shell therein may protect the nano-scale cerium oxide grain cores aggregates in the interior thereof, so as to increase the properties of the particles in each aspect.

In a preferred embodiment, the micro-scale cerium oxide particles are spherical or sphere-like particles, having an average particle size of 0.5 μm to 50 μm, preferably 1 to 10 μm; a BET specific surface area of 50 to 200 $m^2/g$, a pore volume of 0.1 to 0.8 $cm^3/g$, and an average pore diameter of 2 to 40 nm; the mass of the plurality of nano-scale cerium oxide grain cores aggregates in the interior of the shell is from 85 to 99% based on the total mass of the micro-scale cerium oxide particles, and the mass of the cerium oxide shell is from 1 to 15% based on the total mass of the micro-scale cerium oxide particles, wherein the mass of the plurality of nano-scale cerium oxide grain cores aggregates in the interior of the shell and the mass of the cerium oxide shell may be controlled by controlling deposition conditions; the cerium oxide shell has a thickness ranging from 10 to 200 nm, preferably from 20 to 100 nm; the nano-scale cerium oxide grains have an average particle size of 2 to 50 nm, preferably from 2 to 40 nm, even preferably 2 to 30 nm, more preferably 2 to 20 nm, and most preferably 2 to 10 nm; the crystalline and/or amorphous nano-scale cerium oxide particles in the cerium oxide shell have an average particle size of 2 to 50 nm.

The nano-scale cerium oxide grain cores aggregates and the cerium oxide shell both are porous, i.e., have many microscopic channels or orifices, so as to facilitate inward and outward diffusions of reactants and reaction products. These microscopic channels or orifices are formed as follows: they are formed by gaps of microparticles when the numerous microparticles are agglomerated together; alternatively, as described below, when an organic adjuvant is used during the precipitation, the organic adjuvant will be entrained in solid particles, and after being calcined, the organic adjuvant is burnt out, then the channels and orifices are formed at the positions as initially occupied by the organic adjuvant.

A second aspect of the invention is directed to a method for preparation of the micron-scale cerium oxide particles having multi-cores single-shell structure, comprising the following steps: (A). Reacting a cerium salt solution with a precipitant to produce a suspension, then air being bubbled into the produced suspension to carry out oxidization reaction to produce a liquid phase dispersion system of nano-scale cerium oxide precursor, wherein the nano-scale cerium oxide precursor comprises hydroxides of cerium and oxides of cerium; (B). Subjecting the liquid phase dispersion system of the nano-scale cerium oxide precursor to spray drying and calcination, to produce an embryo body of nano-scale cerium oxide grain cores aggregates; (C). Dispersing the embryo body of nano-scale cerium oxide grain cores aggregates into a solvent to produce a suspension, then the cerium salt solution and the precipitant being added to the suspension to carry out a deposition shell-forming reaction around the nano-scale cerium oxide grain cores aggregates, to produce a second suspension; (D). Subjecting the second suspension to spray drying and calcination to produce the micro-scale cerium oxide particles having multi-cores single-shell structure, which is named as "C1".

In a preferred embodiment, between the step A and the step B, the following step is added: an organic adjuvant is added to the liquid phase dispersion system of nano-scale cerium oxide precursor, wherein the organic adjuvant can act the functions of a co-dispersing agent and a pore-forming agent.

In a preferred embodiment, the organic adjuvant includes one or more selected from the group consisting of methylcellulose, starch, aminoacetic acid, 6-aminohexanoic acid, oxalic acid, citric acid, polyethylene glycol having a polymerization degree between 400 and 20000.

In a preferred embodiment, the cerium salt includes cerium(III) nitrate, cerium(III) acetate or cerium(III) sulfate; the cerium salt solution is in a concentration of 0.005 mol/L to 1 mol/L; the precipitant includes ammonia, urea, sodium hydroxide or potassium hydroxide; independently, in the step A, the pH of the suspension, before the oxidization, is adjusted to a range between 7 and 11.5; independently, in the step C, the solvent includes water, anhydrous ethanol, a water-ethanol mixed system or a water-ethylene glycol mixed system; independently, the calcination temperature in the step B and/or step D is from 450 to 750° C.

A third aspect of the invention is directed to a further method for preparation of micro-scale cerium oxide particles having multi-cores single-shell structure, comprising the following steps: (A). Reacting a cerium salt solution with a precipitant to produce a suspension, then air being bubbled into the produced suspension to carry out oxidization reaction to produce a liquid phase dispersion system of nano-scale cerium oxide precursor; (B). Adding an organic adjuvant and the cerium salt solution to the liquid phase dispersion system of nano-scale cerium oxide precursor, to produce a homogenously dispersed liquid phase dispersion system; (C). Subjecting the homogenously dispersed liquid phase dispersion system to spray drying and calcination, to produce the micro-scale cerium oxide particles having multi-cores single-shell structure. Wherein the micro-scale cerium oxide particles having multi-cores single-shell structure as prepared according to this method is named as "C2".

In a preferred embodiment, the cerium salt includes cerium(III) nitrate, cerium(III) acetate or cerium(III) sulfate; the cerium salt solution is in a concentration of 0.005 mol/L to 1 mol/L; the precipitant includes ammonia, urea, sodium hydroxide or potassium hydroxide; independently, in the step A, the pH of the suspension, before the oxidization, is adjusted to a range between 7 and 11.5; the organic adjuvant includes one or more selected from the group consisting of methylcellulose, starch, aminoacetic acid, 6-aminohexanoic acid, oxalic acid, citric acid, polyethylene glycol having a polymerization degree between 400 and 20000; independently, the calcination temperature in the step C is from 450 to 750° C.

A fourth aspect of the invention is directed to a further method for preparation of micro-scale cerium oxide particles having multi-cores single-shell structure, comprising the following steps: (A). Reacting a cerium salt solution with a precipitant to produce a suspension, wherein the cerium salt solution and/or the precipitant contain an organic adjuvant, and the cerium salt is in the stoichiometric excess relative to the precipitant; then air being bubbled into the produced suspension to carry out oxidization reaction to produce a liquid phase dispersion system of nano-scale cerium oxide precursor; (B). Subjecting the liquid phase dispersion system of nano-scale cerium oxide precursor to spray drying and calcination, to produce the micro-scale cerium oxide particles having multi-cores single-shell structure. Wherein the micro-scale cerium oxide particles having multi-cores single-shell structure as prepared according to this method is named as "C3".

In the method, cerium ions in the excessive cerium salts will bond to the organic adjuvant, to produce a cerium oxide shell during the spray drying and calcination.

In a preferred embodiment, the cerium salt includes cerium(III) nitrate, cerium(III) acetate or cerium(III) sulfate; the cerium salt solution is in a concentration of 0.005 mol/L to 1 mol/L; the precipitant includes ammonia, urea, sodium hydroxide or potassium hydroxide; the organic adjuvant includes one or more selected from the group consisting of methylcellulose, starch, aminoacetic acid, 6-aminohexanoic acid, oxalic acid, citric acid, polyethylene glycol having a polymerization degree between 400 and 20000; independently, in the step A, the pH of the suspension, before the oxidization, is adjusted between 8 and 11.5; independently, the calcination temperature in the step B is from 450 to 750° C.

A fifth aspect of the invention is directed to a supported catalyst that includes a support and an active component supported on the support, wherein the support is the micro-scale cerium oxide particle having multi-cores single-shell structure according to the first aspect of the invention, and the active component is nanoparticles of noble metals or transition metals, dispersed on the plurality of nano-scale cerium oxide grain cores and/or on the cerium oxide shell.

In a preferred embodiment, the noble metal may be Pt or Pd, wherein the noble metal is in an oxidative state or in an elemental state, and by calculations based on the mass of the noble metals, the loading quantity of the noble metal is 0.02 to 5% based on the mass of the micro-scale cerium oxide particles having multi-cores single-shell structure; independently, the transition metal is Mn, Fe, Co, Ni or Cu, wherein the transition metal is in an oxidative state, and by calculations based on the mass of the transition metals, the loading quantity of the transition metal is 0.1 to 20% based on the mass of the micro-scale cerium oxide particles having multi-cores single-shell structure.

A sixth aspect of the invention is directed to the use of the supported catalyst according to the fifth aspect of the invention, wherein the supported catalyst is used for catalysis of NO oxidation, CO oxidation, three-way catalytic reactions of vehicle off-gases or oxidative elimination reaction of organics.

The present invention has the following beneficial effects: (1). The micro-scale cerium oxide particles having multi-cores single-shell structure according to the invention have large specific surface area, high mechanical strength and good hydrothermal stability. (2). Supported catalysts as prepared by using the micro-scale cerium oxide particles having multi-cores single-shell structure according to the invention have the advantages: good hydrothermal stability, good sulfur resistance, no easiness of supported active components, e.g., noble metals or transition metals, to be embedded during hydrothermal aging at a high temperature.

EXAMPLES

The following examples are list out for illustrating the invention, while these examples are not limiting.

Comparative Example

Nano-scale cerium oxide grain aggregates without multi-cores single-shell structure are papered according to the following steps: (A). A 0.005 mol/L cerium(III) nitrate solution was reacted with ammonia to produce a suspension, and the pH of the produced suspension was regulated to be 7; air was bubbled into the produced suspension to oxidize it, to produce a liquid phase dispersion system of nano-scale cerium oxide precursor; (B). The produced liquid phase dispersion system of nano-scale cerium oxide precursor was subjected to spray drying, and then was calcined at 450° C. to produce nano-scale cerium oxide grain aggregates; the nano-scale cerium oxide grain aggregates without multi-cores single-shell structure as prepared according to the method was named as "C-0".

As for the preparation process in the step A, please see the reference document: X.-D. Zhou, W. Huebner, H. U. Anderson, Processing of nanometer-scale $CeO_2$ particles[J], Chemical Materials, 2003, 15:378-382, which is cited herein for the reference.

Examples 1-4

The micron-scale cerium oxide particles C1 having multi-cores single-shell structure are prepared according to the following steps: (A). Reacting a cerium salt solution with a precipitant to produce a suspension, while regulating the pH of the produced suspension, air being bubbled to carry out oxidization reaction to produce a liquid phase dispersion system of nano-scale cerium oxide precursor; wherein optionally, an organic adjuvant is added to the liquid phase dispersion system of nano-scale cerium oxide precursor; (B). Subjecting the liquid phase dispersion system of the nano-scale cerium oxide precursor to spray drying and calcination, to produce an embryo body of nano-scale cerium oxide grain cores aggregates; (C). Dispersing the embryo body of nano-scale cerium oxide grain cores aggregates into a solvent to produce a suspension, then the cerium salt solution and the precipitant being added to the suspension to carry out a deposition shell-forming reaction around the nano-scale cerium oxide grain cores aggregates, to produce a second suspension; (D). Subjecting the second suspension to spray drying and calcination to produce the micro-scale cerium oxide particles having multi-cores single-shell structure, named as "C1".

Specific experimental results are shown in Table 1.

TABLE 1

| Preparation conditions for Examples 1-4 | | | | |
|---|---|---|---|---|
| | example 1 (C1-1) | example 2 (C1-2) | example 3 (C1-3) | example 4 (C1-4) |
| Cerium salt solution and concentration thereof in the step A | 0.1 mol/L cerium(III) nitrate | 0.05 mol/L cerium(III) sulfate | 0.5 mol/L cerium(III) nitrate | 1 mol/L cerium(III) acetate |
| Precipitant in the step A | Ammonia | Ammonia | 1 mol/L sodium hydroxide solution | Ammonia |
| pH of the suspension in the step A | 9.8 | 8.5 | 11.5 | 10.2 |
| Organic adjuvant and concentration thereof in the step A | None | Polyethylene glycol 400 24 g/L, 6-aminohexanoic acid 0.01 mol/L | Polyethylene glycol 4000 30 g/L, aminoacetic acid 0.014 mol/L | Soluble starch 25 n/L citric acid 0.01 mol/L |
| Calcination temperature in the step B/° C. | 500 | 450 | 600 | 700 |
| Calcination temperature in the step D/° C. | 500 | 600 | 500 | 500 |
| solvents in the step C | Water | Ethanol | Water | Water |
| Cerium salt solution and concentration thereof in the step C | 0.05 mol/L cerium(III) nitrate | 0.05 mol/L cerium(III) sulfate | 0.02 mol/L cerium(III) nitrate | 0.01 mol/L cerium(III) nitrate |
| Precipitant in the step C | Ammonia | Ammonia | 1 mol/L sodium hydroxide solution | Ammonia |

Examples 5-8

The micron-scale cerium oxide particles C2 having multi-cores single-shell structure are prepared according to the following steps: (A). Reacting a cerium salt solution with a precipitant to produce a suspension, whiling regulating the pH of the produced suspension, air being bubbled to carry out oxidization reaction to produce a liquid phase dispersion system of nano-scale cerium oxide precursor; (B). Adding an organic adjuvant and the cerium salt solution to the liquid phase dispersion system of nano-scale cerium oxide precursor, to produce a homogenously dispersed liquid phase dispersion system; (C). Subjecting the homogenously dispersed liquid phase dispersion system to spray drying and calcination, to produce micro-scale cerium oxide particles having multi-cores single-shell structure, wherein the micro-scale cerium oxide particles having multi-cores single-shell structure as prepared according to the method is named as "C2".

Specific experimental results are shown in Table 2.

TABLE 2

Preparation conditions for Examples 5-8

|  | example 5 (C2-1) | example 6 (C2-2) | example 7 (C2-3) | example 8 (C2-4) |
|---|---|---|---|---|
| Cerium salt solution and concentration thereof in the step A | 0.1 mol/L cerium(III) nitrate | 0.05 mol/L cerium(III) sulfate | 0.5 mol/L cerium(III) nitrate | 1 mol/L cerium(III) acetate |
| Precipitant in the step A | 1 mol/L sodium hydroxide solution | Ammonia | Ammonia | Ammonia |
| pH of the suspension in the step A | 11 | 8.5 | 9.6 | 10.2 |
| Organic adjuvant and concentration thereof in the step B | None | Polyethylene glycol 4000 24 g/L, aminoacetic acid 0.014 mol/L | Methyl cellulose | Soluble starch 25 g/L citric acid 0.01 mol/L |
| Cerium salt solution and concentration thereof in the step B | 0.02 mol/L cerium(III) nitrate | 0.02 mol/L cerium(III) nitrate | 0.015 mol/L cerium(III) acetate | 0.015 mol/L cerium(III) acetate |
| Calcination temperature in the step C/° C. | 500 | 600 | 500 | 600 |

Examples 9-12

The micron-scale cerium oxide particles C3 having multi-cores single-shell structure are prepared according to the following steps: (A). Reacting a cerium salt solution with a precipitant to produce a suspension, wherein the cerium salt solution and/or the precipitant contain an organic adjuvant, and the cerium salt is in the stoichiometric excess relative to the precipitant; while regulating the pH of the produced suspension, air being bubbled to carry out oxidization reaction to produce a liquid phase dispersion system of nano-scale cerium oxide precursor; (B). Subjecting the liquid phase dispersion system of nano-scale cerium oxide precursor to spray drying and calcination, to produce micro-scale cerium oxide particles having multi-cores single-shell structure, wherein the micro-scale cerium oxide particles having multi-cores single-shell structure as prepared according to the method is named as "C3".

Specific experimental results are shown in Table 3.

TABLE 3

Preparation conditions for Examples 9-12

|  | example 9 (C3-1) | example 10 (C3-2) | example 11 (C3-3) | example 12 (C3-4) |
|---|---|---|---|---|
| Cerium salt solution and concentration thereof in the step A | 0.5 mol/L cerium(III) nitrate | 0.05 mol/L cerium(III) nitrate | 0.1 mol/L cerium(III) acetate | 1 mol/L cerium(III) nitrate |
| Precipitant in the step A | Ammonia | Ammonia | 1 mol/L sodium hydroxide solution | Ammonia |
| pH of the suspension in the step A | 11.2 | 8.5 | 9.6 | 10.2 |
| Organic adjuvant and concentration thereof in the step A | Polyethylene glycol 400 24 g/L aminoacetic acid 0.014 mol/L | Polyethylene glycol 400 24 g/L | Methyl cellulose | Soluble starch 25 g/L, citric acid 0.01 mol/L |
| Calcination temperature in the step B/° C. | 600 | 600 | 600 | 600 |

Example 13

This example uses the materials as prepared in Examples C1-1, C2-1, C3-1 and Comparative Example C-0 as the sample, and tests them in the hydrothermal stability aspect. The term "fresh" represents newly-prepared samples, and the term "aged" represents samples after the hydrothermal reaction. The conditions for tests of hydrothermal stability are that the hydrothermal aging treatment is conducted at 750° C. and in an air atmosphere containing 10% $H_2O$ for 20 hours. The results are shown in Table 4:

TABLE 4

Test results of hydrothermal stability

| Sample | | C-0 | C1-1 | C2-1 | C3-1 |
|---|---|---|---|---|---|
| BET specific surface area | Fresh ($m^2/g$) | 110 | 105 | 100 | 130 |
| | Aged ($m^2/g$) | 25 | 50 | 35 | 70 |
| | Reduction (%) | 77 | 52 | 65 | 46 |
| Pore volume | Fresh ($cm^3/g$) | 0.337 | 0.352 | 0.321 | 0.412 |
| | Aged ($cm^3/g$) | 0.102 | 0.210 | 0.155 | 0.231 |
| | Reduction (%) | 70 | 40 | 52 | 44 |
| Average pore diameter | Fresh (nm) | 12.1 | 13.5 | 14.4 | 12.3 |
| | Aged (nm) | 17.0 | 14.1 | 15.1 | 14.1 |
| | Increase (%) | 40 | 4 | 5 | 15 |
| Average grain diameter | Fresh (nm) | 8 | 8 | 8 | 7 |
| | Aged (nm) | 22 | 13 | 14 | 13 |
| | Increase (%) | 175 | 63 | 75 | 86 |

Note:
the pore volume data selects corresponding adsorption volumes at the maximum pressure in nitrogen isothermal adsorption; the average pore diameter selects desorption values as calculated in BJH calculations; the average grain diameter is calculated based on the full width at half maximum of the diffraction peak of the crystal plane (111) of $CeO_2$ having a Cubic Fluorite structure in the X-ray diffraction pattern (XRD), and in the XRD of a copper target, $2\theta = 28.5-28.9°$ (the range is caused due to systematic errors of associated apparatus).

As shown in Table 4, for a fresh sample, the BET specific surface areas, pore volumes, average pore diameters and average grain diameters of the samples C1-1, C2-1 and C3-1 having multi-cores single-shell structure differ from those of comparative sample C-0 by less than 20%, and this shows that the multi-cores single-shell structure per se will produce less impacts on the physical property parameters of the materials. The physical structural parameters of all the samples after the hydrothermal aging each vary, including the reduction in the BET specific surface area, the reduction in the pore volume, the increase in the average pore diameter and the increase in the average grain diameter. At this time, the variations of all the samples having multi-cores single-shell structure in the physical property parameters each are less than those of the sample C-0: the reduction in the BET specific surface area decreases from 70% to the range of 46% to 65%; the reduction in the pore volume decreases from 70% to the range of 40% to 52%; the increase in the average pore diameter decreases from 40% to the range of 4 to 15%; and the increase in the average grain diameter decreases from 175% to the range of 63% to 86%. The results confirms that the multi-cores single-shell structure of the samples as prepared according to the method of the invention can significantly increase the ability of the samples to resist the structural variations during the hydrothermal aging, and thus the samples have good hydrothermal stability.

Example 14

The micro-scale cerium oxide particles C3-1 having multi-cores single-shell structure as prepared in Example 9 and the nano-scale cerium oxide grain aggregates C-0 without multi-cores single-shell structure as prepared in Comparative Example, support the elemental noble metal Pd in an amount of 2% by weight of the cerium oxide materials, respectively. The Pd-supported C3-1 and the Pd-supported C-0 are respectively subjected to hydrothermal treatment, in which the hydrothermal aging is carried out in an air atmosphere containing 10% $H_2O$ at 750° C. for 20 hours.

Figure 9A:
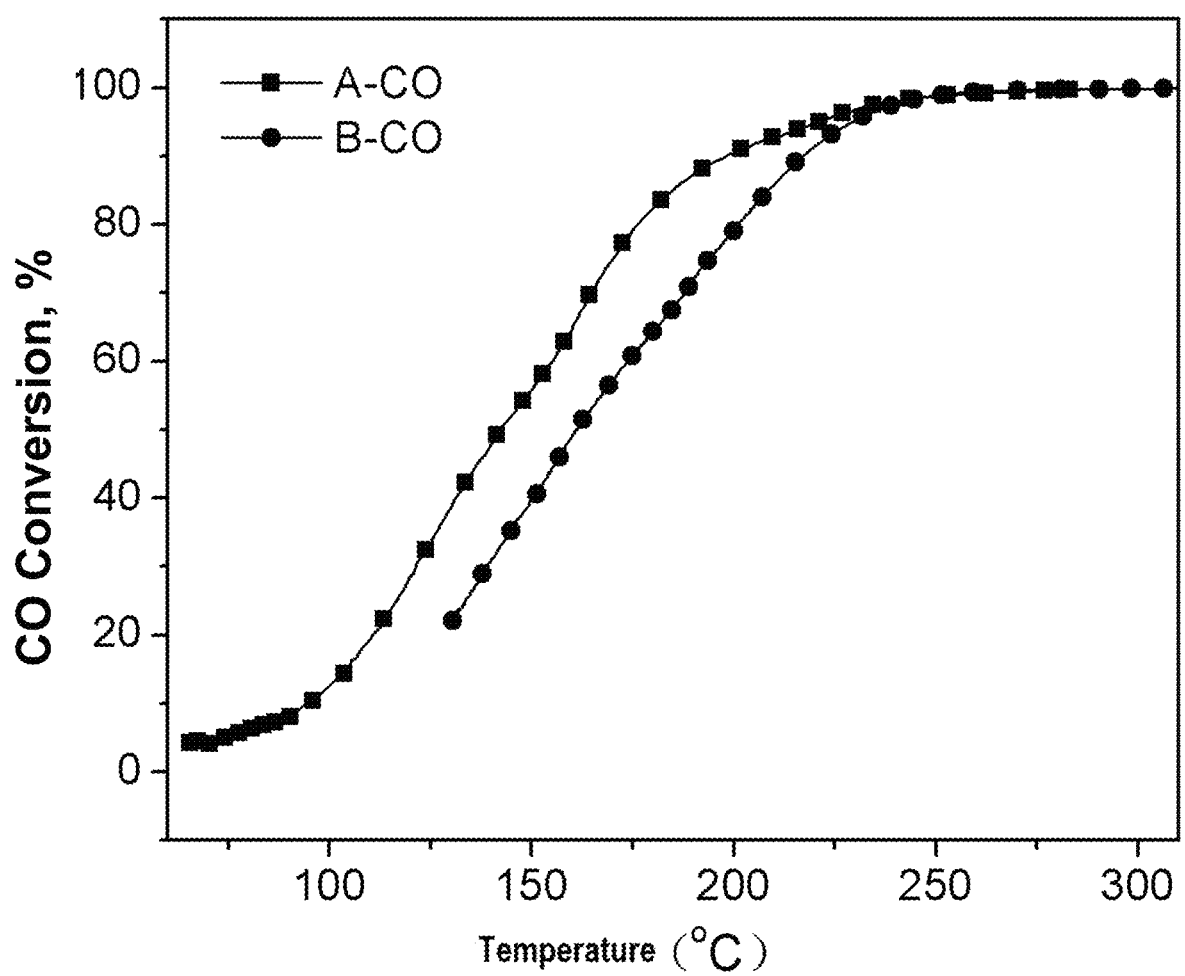
FIG. 9A-FIG. 9B is a curve for showing the catalytic activities for catalyzing a mixed gas containing CO and $C_3H_6$ with the catalysts obtainable by respectively supporting Pd with the micro-scale cerium oxide particles C3-1 having multi-cores single-shell structure as prepared in Example 9 and with the cerium oxide aggregates C-0 as prepared in the comparative example and then subjecting the supported catalysts to hydrothermal treatments.
Figure 9B:
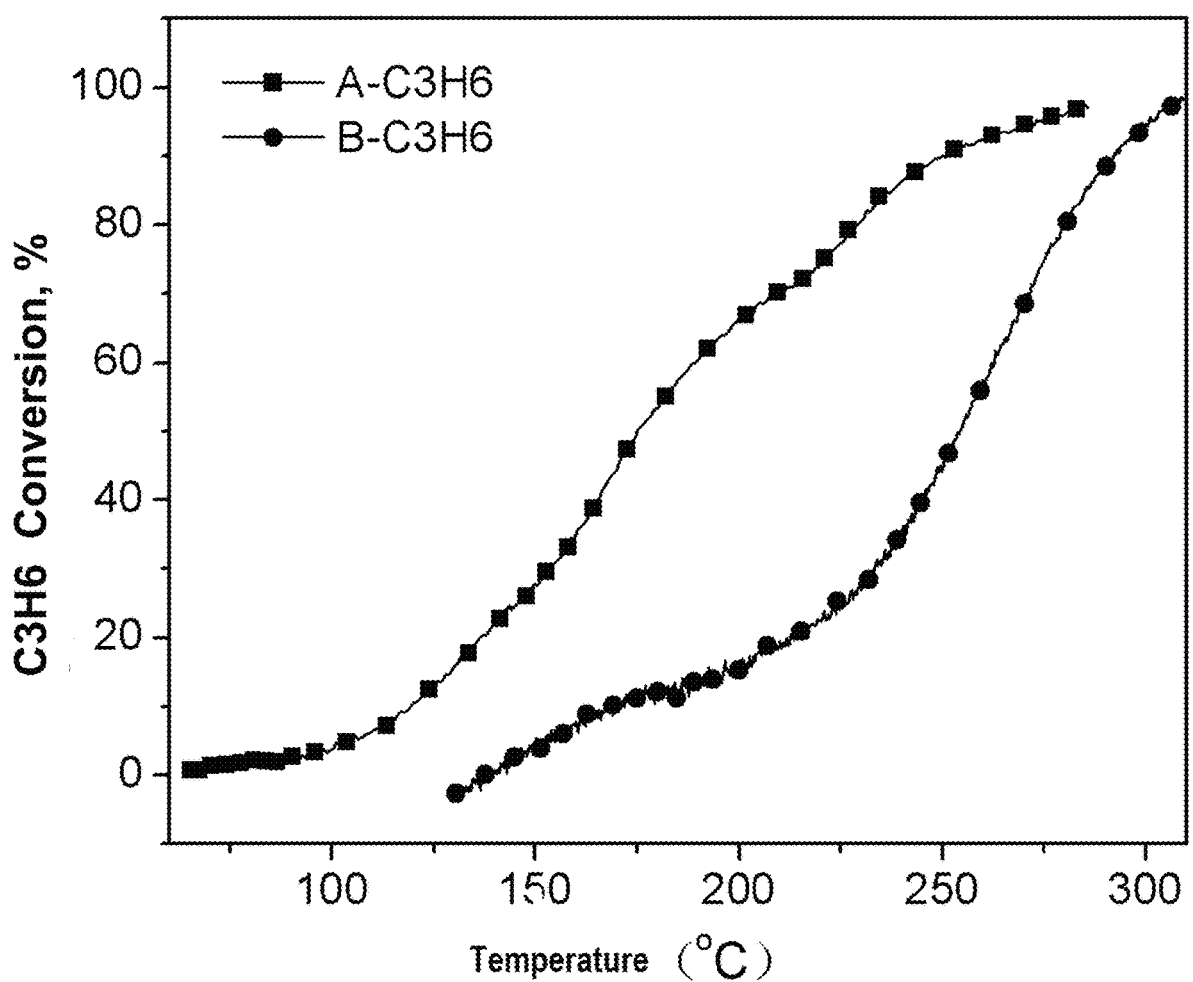

After the hydrothermal treatment, the Pd-supported C3-1 (abbreviated as Pd/C3-1) and the Pd-supported C-0 (abbreviated as Pd/C-0) are used for catalyzing the oxidative reaction experiment of a mixed gas containing CO and $C_3H_6$, and the corresponding experimental conditions include: the total reaction atmosphere comprising 1000 ppm CO, 150 ppm $C_3H_6$, 5% $CO_2$, 5% $O_2$, 5% $H_2O$, and the balance being $N_2$; the amount of the catalyst of 0.2 g; the total gas flow of 1 L/min; and the programmed temperature rising rate of 10° C./min. The experimental results are shown in FIG. 9. Clearly, at the same temperature, the Pd/C3-1 catalyst exhibits CO conversion and $C_3H_6$ conversion both higher than the Pd/C-0 catalyst. Alternatively, in the same conversion level, the reaction temperature as required by the Pd/C3-1 catalyst is lower than that as required by the Pd/C-0 catalyst, and the lower reaction temperature is advantageous for prolonging the lifetime of the catalysts. The above experiments not only show that the Pd/C3-1 catalyst have a strong ability to resist hydrothermal aging, but also demonstrate that the active component in the catalyst is not easily embedded.

Example 15

The micro-scale cerium oxide particles C3-1 having multi-cores single-shell structure as prepared in Example 9 and the nano-scale cerium oxide grain aggregates C-0 without multi-cores single-shell structure as prepared in Comparative Example, support the elemental noble metal Pd in an amount of 2% by weight of the cerium oxide materials, respectively. The Pd-supported C3-1 and the Pd-supported C-0 are respectively subjected to sulfurization treatment, in which the sulfurization treatment is carried out in an atmosphere containing 10% H2O and 40 ppm SO2 at 300° C. for 20 hours.

Figure 10A:
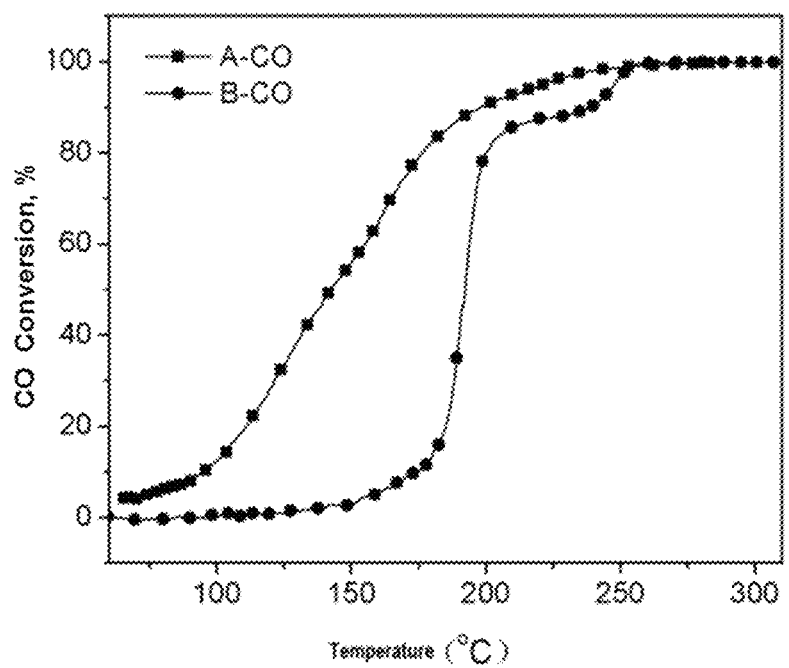
FIG. 10A-FIG. 10B is a curve for showing the catalytic activities for catalyzing a mixed gas containing CO and $C_3H_6$ with the catalysts obtainable by respectively supporting Pd with the micro-scale cerium oxide particles C3-1 having multi-cores single-shell structure as prepared in Example 9 and with the cerium oxide aggregates C-0 as prepared in the comparative example, and then subjecting the supported catalysts to sulfurization treatments.
Figure 10B:
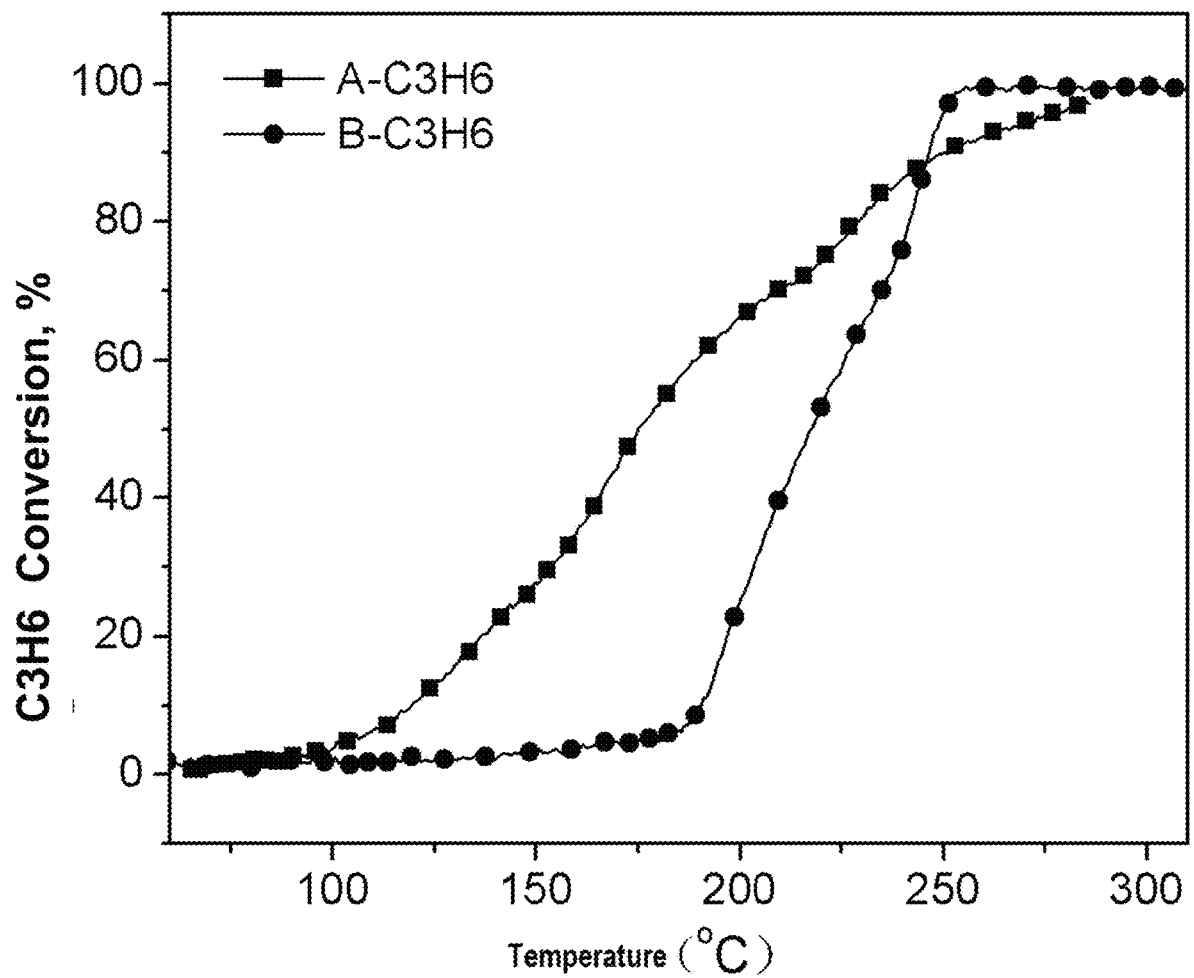

After the sulfurization treatment, the Pd-supported C3-1 and the Pd-supported C-0 are used for catalyzing the oxidative reaction experiment of a mixed gas containing CO and C3H6, and the corresponding experimental conditions include: the total reaction atmosphere comprising 1000 ppm CO, 150 ppm C3H6, 5% CO2, 5% O2, 5% H2O, and the balance being N2; the amount of the catalyst of 0.2 g; the total gas flow of 1 L/min; and the programmed temperature rising rate of 10° C./min. The experimental results are shown in FIG. 10. Clearly, after being subjecting to the same sulfurization treatments and at the same temperature, the Pd/C3-1 catalyst exhibits CO conversion and C3H6 conversion both higher than the Pd/C-0 catalyst. Alternatively, in the same conversion level, the reaction temperature as required by the Pd/C3-1 catalyst is lower than that as required by the Pd/C-0 catalyst, and this demonstrates that the Pd/C3-1 catalyst has a stronger sulfur resistance.

Example 16

The micro-scale cerium oxide particles C3-1 having multi-cores single-shell structure as prepared in Example 9 and the nano-scale cerium oxide grain aggregates C-0 without multi-cores single-shell structure as prepared in Comparative Example support the transition metal Mn in oxidative state in an amount of 2% by weight of the cerium oxide materials (based on the mass percentage of the metal), respectively. The Mn-supported C3-1 and the Mn-supported C-0 are respectively subjected to hydrothermal treatment, in which the hydrothermal aging is carried out in an air atmosphere containing 10% H2O at 750° C. for 20 hours.

Figure 11:
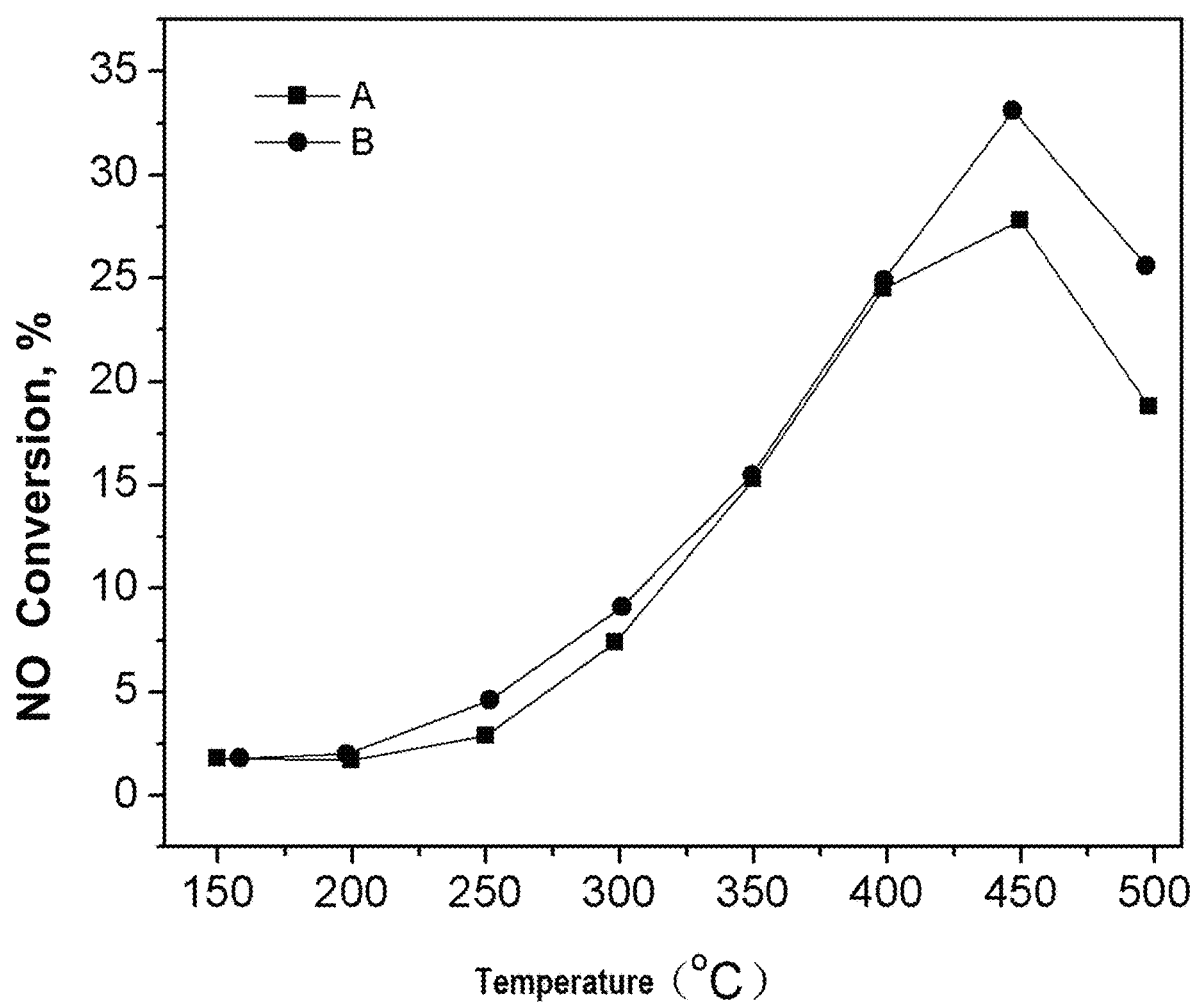
FIG. 11 is a curve for showing the catalytic activities for catalyzing a NO-containing gas with the catalysts obtainable by respectively supporting Mn with the micro-scale cerium oxide particles C3-1 having multi-cores single-shell structure as prepared in Example 9 and with the cerium oxide aggregates C-0 as prepared in the comparative example, and then subjecting the supported catalysts to hydrothermal treatments, wherein the symbol A represents the supported catalyst Mn/C3-1 after being subjected to the hydrothermal treatments, and the symbol B represents the supported catalyst Mn/C-0 after being subjected to the hydrothermal treatments.

After the hydrothermal treatment, the Mn-supported C3-1 (abbreviated as Mn/C3-1) and the Mn-supported C-0 (abbreviated as Mn/C-0) are used for catalyzing the oxidative reaction experiment of a NO-containing gas, and the corresponding experimental conditions include: the total reaction atmosphere comprising 100 ppm NO, 5% CO2, 5% O2, and the balance being N2; the amount of the catalyst of 0.2 g; the total gas flow of 1 L/min; and the programmed temperature rising rate of 10° C./min. The experimental results are shown in FIG. 11. Clearly, at the same temperature, the Mn/C3-1 catalyst exhibits NO conversion higher than the Mn/C-0 catalyst. Alternatively, in the same conversion level, the reaction temperature as required by the Mn/C3-1 catalyst is lower than that as required by the Mn/C-0 catalyst, and the lower reaction temperature is advantageous for prolonging the lifetime of the catalysts. The above experiments not only show that the Mn/C3-1 catalyst have a strong ability to resist hydrothermal aging, but also demonstrate that the active component in the catalyst is not easily embedded.

Example 17

The micro-scale cerium oxide particles C3-1 having multi-cores single-shell structure as prepared in Example 9 and the nano-scale cerium oxide grain aggregates C-0 without multi-cores single-shell structure as prepared in Comparative Example support the transition metal Mn in oxidative state in an amount of 2% by weight of the cerium oxide materials (based on the mass percentage of the metal), respectively. The Mn-supported C3-1 and the Mn-supported C-0 are respectively subjected to sulfurization treatment, in which the sulfurization treatment is carried out in an atmosphere containing 10% H2O and 40 ppm SO2 at 300° C. for 20 hours.

Figure 12:
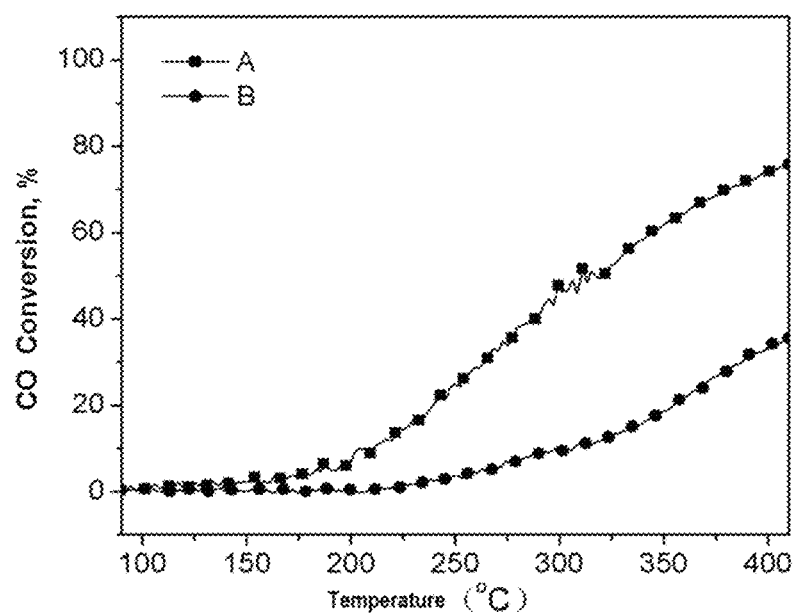
FIG. 12 is a curve for showing the catalytic activities for catalyzing a CO-containing gas with the catalysts obtainable by respectively supporting Mn with the micro-scale cerium oxide particles C3-1 having multi-cores single-shell structure as prepared in Example 9 and with the cerium oxide aggregates C-0 as prepared in the comparative example, and then subjecting the supported catalysts to sulfurization treatments, wherein the symbol A represents the supported catalyst Mn/C3-1 after being subjected to the sulfurization treatments, and the symbol B represents the supported catalyst Mn/C-0 after being subjected to the sulfurization treatments.

After the sulfurization treatment, the Mn-supported C3-1 and the Mn-supported C-0 are used for catalyzing the oxidative reaction experiment of a CO containing gas, and the corresponding experimental conditions include: the total reaction atmosphere comprising 1000 ppm CO, 5% CO2, 5% O2, 5% H2O, and the balance being N2; the amount of the catalyst of 0.2 g; the total gas flow of 1 L/min; and the programmed temperature rising rate of 10° C./min. The experimental results are shown in FIG. 12. Clearly, after being subjecting to the same sulfurization treatment and at the same temperature, the Mn/C3-1 catalyst exhibits CO conversion higher than the Mn/C-0 catalyst. Alternatively, in the same conversion level, the reaction temperature as required by the Mn/C3-1 catalyst is lower than that as required by the Pd/C-0 catalyst, and this can demonstrate that the Mn/C3-1 catalyst has a higher sulfur resistance.

As seen from Examples 14 and 16, the micro-scale cerium oxide particles having multi-cores single-shell structure as prepared according to the invention, as compared with conventional cerium oxide without shells, have obviously excellent ability to resist hydrothermal aging after they are prepared into functional catalysts by supporting noble metals or transition meals. After being subjected to the hydrothermal aging treatment in an air atmosphere containing 10% H2O at 750° C. for 20 hour, the activity of the catalyst as involved in the invention is obviously superior to that of conventional catalysts without shells.

As seen from Examples 15 and 17, the micro-scale cerium oxide particles having multi-cores single-shell structure as prepared according to the invention, as compared with conventional cerium oxide without shells, have obviously excellent ability to resist sulfur poisoning after they are prepared into functional catalysts by supporting noble metals or transition meals. After being subjected to the sulfurization treatment in an air atmosphere containing 40 ppm SO2 and 10% H2O at 300° C. for 20 hour, the activity of the catalyst as involved in the invention is obviously superior to that of conventional catalysts without shells.

The invention claimed is:

1. A micro-scale cerium oxide particle having a multi-core single-shell structure, wherein the micro-scale cerium oxide particle comprises:
   a cerium oxide shell, the cerium oxide shell being composed of crystalline and/or amorphous nano-scale cerium oxide particles; and
   a plurality of nano-scale cerium oxide grain core aggregates located in an interior of the cerium oxide shell; wherein:
      the micro-scale cerium oxide particles are spherical or spheroid particles having an average particle size of from 0.5 microns (μm) to 50 μm and a Brunauer-Emmett-Teller (BET) specific surface area of from 50 m$^2$/g to 200 m$^2$/g;
      the plurality of nano-scale cerium oxide grain core aggregates in the interior of the cerium oxide shell having a mass from 85% to 99% based on a total mass of the micro-scale cerium oxide particles, the nano-scale cerium oxide grains having an average particle size of 2 nanometers (nm) to 50 nm;
      the cerium oxide shell having a mass of from 1% to 15% based on the total mass of the micro-scale cerium oxide particles;
      the cerium oxide shell having a thickness of from 10 nm to 200 nm; and
      the crystalline and/or amorphous nano-scale cerium oxide particles in the cerium oxide shell having an average particle size of from 2 nm to 50 nm.

2. A method for preparing micron-scale cerium oxide particles having a multi-core single-shell structure, comprising:
   (A) reacting a cerium salt solution with a precipitant, thereby producing a suspension;
   (B) bubbling air into the produced suspension, thereby producing a liquid phase dispersion system of a nano-scale cerium oxide precursor;
   (C) subjecting the liquid phase dispersion system of the nano-scale cerium oxide precursor to a spray drying and calcination process, thereby producing an embryo body of nano-scale cerium oxide grain core aggregates;
   (D) dispersing the embryo body of nano-scale cerium oxide grain core aggregates into a solvent, thereby producing a suspension;
   (E) adding the cerium salt solution and the precipitant to the suspension to conduct a deposition shell-forming reaction around the nano-scale cerium oxide grain core aggregates thereby producing a second suspension; and
   (F) subjecting the second suspension to a spray drying and calcination process, thereby producing the micro-scale cerium oxide particles having the multi-core single-shell structure.

3. The method according to claim 2, wherein between the step B and the step C, the method further comprises: adding an organic adjuvant to the liquid phase dispersion system of the nano-scale cerium oxide precursor.

4. The method according to claim 3, wherein the organic adjuvant includes one or more selected from the group consisting of methylcellulose, starch, aminoacetic acid, 6-aminohexanoic acid, oxalic acid, citric acid, and polyethylene glycol having a polymerization degree of from 400 to 20000.

5. The method according to claim 2, wherein:
   the cerium salt includes cerium(III) nitrate, cerium(III) acetate or cerium(III) sulfate;
   the cerium salt solution is in a concentration of from 0.005 moles per liter (mol/L) to 1 mol/L;
   the precipitant includes ammonia, urea, sodium hydroxide or potassium hydroxide;
   in the step A, a pH of the suspension, before the oxidization, is adjusted to a range of from 7 to 11.5;
   in the step D, the solvent includes water, anhydrous ethanol, a water-ethanol mixed system or a water-ethylene glycol mixed system; and
   the calcination temperature in the step C and/or step F is of from 450° C. to 750° C.

6. A method for preparing micro-scale cerium oxide particles having a multi-core single-shell structure, comprising the steps of:
   (A) reacting a cerium salt solution with a precipitant, thereby producing a suspension;
   (B) bubbling air into the produced suspension to conduct an oxidization reaction, thereby producing a liquid phase dispersion system of a nano-scale cerium oxide precursor;
   (C) adding an organic adjuvant and the cerium salt solution to the liquid phase dispersion system of the nano-scale cerium oxide precursor, thereby producing a homogenously dispersed liquid phase dispersion system; and (D) subjecting the homogenously dispersed liquid phase dispersion system to a spray drying and calcination process, thereby producing the micro-scale cerium oxide particles having the multi-core single-shell structure.

7. The method according to claim 6, wherein:

the cerium salt includes cerium(III) nitrate, cerium(III) acetate or cerium(III) sulfate;

the cerium salt solution is in a concentration of from 0.005 mol/L to 1 mol/L;

the precipitant includes ammonia, urea, sodium hydroxide or potassium hydroxide;

in the step A, a pH of the suspension, before the oxidization, is adjusted to a range of from 7 to 11.5;

the organic adjuvant includes one or more selected from the group consisting of methylcellulose, starch, aminoacetic acid, 6-aminohexanoic acid, oxalic acid, citric acid, polyethylene glycol having a polymerization degree of from 400 to 20000; and the calcination temperature in the step D is of from 450° C. to 750° C.

8. A method for preparing micro-scale cerium oxide particles having a multi-core single-shell structure, comprising the steps of:

(A) reacting a cerium salt solution with a precipitant, thereby producing a suspension, wherein the cerium salt solution and/or the precipitant contain an organic adjuvant, and the cerium salt is in the stoichiometric excess relative to the precipitant, (B) bubbling air into the produced suspension to conduct an oxidization reaction, thereby producing a liquid phase dispersion system of a nano-scale cerium oxide precursor; and (C) subjecting the liquid phase dispersion system of the nano-scale cerium oxide precursor to a spray drying and calcination process, thereby producing the micro-scale cerium oxide particles having the multi-core single-shell structure.

9. The method according to claim 8, wherein:

the cerium salt includes cerium(III) nitrate, cerium(III) acetate or cerium(III) sulfate;

the cerium salt solution is in a concentration of from 0.005 mol/L to 1 mol/L;

the precipitant includes ammonia, urea, sodium hydroxide or potassium hydroxide;

the organic adjuvant includes one or more selected from the group consisting of methylcellulose, starch, aminoacetic acid, 6-aminohexanoic acid, oxalic acid, citric acid, polyethylene glycol having a polymerization degree between 400 and 20000;

in the step A, a pH of the suspension, before the oxidization, is adjusted to a range of from 7 to 11.5; and the calcination temperature in the step C is of from 450° C. to 750° C.

* * * * *